US010664793B1

(12) United States Patent
Rehn et al.

(10) Patent No.: US 10,664,793 B1
(45) Date of Patent: May 26, 2020

(54) SYSTEMS AND METHODS FOR AUTOMATIC PACKAGE TRACKING AND PRIORITIZED REORDERING

(71) Applicant: COUPANG CORP., Seoul (KR)

(72) Inventors: Erik Rehn, Seoul (KR); Keunwoo Sung, Seoul (KR); Hyun Bo Kang, Seoul (KR); Ji Ho Chang, Seoul (KR); Hyo Jeong Lee, Seoul (KR)

(73) Assignee: COUPANG CORP., Seoul (KR)

( * ) Notice: Subject to any disclaimer, the term of this patent is extended or adjusted under 35 U.S.C. 154(b) by 0 days.

(21) Appl. No.: 16/356,100

(22) Filed: Mar. 18, 2019

(51) Int. Cl.
*G06Q 10/08* (2012.01)
*G06Q 10/06* (2012.01)

(52) U.S. Cl.
CPC ... *G06Q 10/0833* (2013.01); *G06Q 10/06315* (2013.01); *G06Q 10/08355* (2013.01)

(58) Field of Classification Search
CPC ......... G06Q 10/0833; G06Q 10/06315; G06Q 10/08355
See application file for complete search history.

(56) References Cited

U.S. PATENT DOCUMENTS

| | | | | |
|---|---|---|---|---|
| 4,832,204 A * | 5/1989 | Handy | ...................... | B07C 3/00 209/3.3 |
| 5,038,283 A * | 8/1991 | Caveney | .............. | B65G 1/1371 235/384 |
| 5,770,841 A * | 6/1998 | Moed | ....................... | B07C 3/00 235/375 |
| 5,940,835 A * | 8/1999 | Sit | ....................... | G06F 16/9017 |
| 6,285,916 B1 * | 9/2001 | Kadaba | .................. | G06Q 10/08 700/222 |
| 6,304,856 B1 * | 10/2001 | Soga | ..................... | G06Q 10/063 705/28 |
| 6,539,360 B1 * | 3/2003 | Kadaba | .................. | G06Q 10/08 700/215 |
| 6,772,130 B1 * | 8/2004 | Karbowski | ............ | G06Q 10/08 705/26.1 |
| 6,789,729 B1 * | 9/2004 | Solan | ..................... | G06Q 10/08 235/375 |

(Continued)

OTHER PUBLICATIONS

Anteneh Ayanso, "Inventory rationing via drop-shipping in Internet retailing: A sensitivity analysis", published by European Journal of Operational Research, in 2004 (Year: 2004).*

*Primary Examiner* — Kevin H Flynn
*Assistant Examiner* — Omar Zeroual
(74) *Attorney, Agent, or Firm* — Finnegan, Henderson, Farabow, Garrett & Dunner LLP

(57) ABSTRACT

Methods and systems for automatic package tracking and prioritized reordering include receiving, through a network interface, information relating to an order, a first package identifier associated with a first package, and event data associated with a plurality of package identifiers that include the first package identifier, the order comprising a first group of items, where the first package is configured to hold the first group of items and is to be delivered to a first recipient within a first predetermined period of time through one or more existing routes; parsing the event data based on the first package identifier; determining whether the first package exists based on the information; and transmitting a signal to a computer system to deliver the first package or to reorder the first package based on the determinations.

19 Claims, 11 Drawing Sheets

FIG. 1A

(56) References Cited

U.S. PATENT DOCUMENTS

| Patent/Pub. No. | Date | Inventor | Classification |
|---|---|---|---|
| 6,889,194 B1* | 5/2005 | Kadaba | G06Q 10/08 705/330 |
| 6,976,007 B1* | 12/2005 | Boucher | G06Q 10/08 705/28 |
| 7,081,595 B1* | 7/2006 | Brandt | B07C 3/00 209/584 |
| 7,090,134 B2* | 8/2006 | Ramsager | B07C 3/18 235/462.13 |
| 7,177,825 B1* | 2/2007 | Borders | G06Q 10/0631 705/26.81 |
| 7,233,914 B1* | 6/2007 | Wijaya | G06Q 10/087 705/26.1 |
| 7,243,845 B2* | 7/2007 | Cash | G06Q 10/08 235/384 |
| 7,561,717 B2* | 7/2009 | Anderson | G06K 17/0022 382/101 |
| 7,745,754 B2* | 6/2010 | Conard | B07C 3/00 209/547 |
| 7,984,809 B1* | 7/2011 | Ramey | B65G 1/137 209/546 |
| 8,468,214 B1* | 6/2013 | Bourlas | H04L 67/12 709/217 |
| 8,560,461 B1* | 10/2013 | Tian | G06Q 10/087 705/332 |
| 8,577,335 B2* | 11/2013 | Chandaria | G06Q 10/0833 455/41.3 |
| 9,202,194 B1* | 12/2015 | Mistry | G06Q 10/0833 |
| 9,552,565 B2* | 1/2017 | Minogue | |
| 9,779,435 B2* | 10/2017 | Crutcher | G06Q 30/06 |
| 9,892,379 B1* | 2/2018 | Danyluk | G06Q 10/0833 |
| 10,181,110 B1* | 1/2019 | Atkinson | G06Q 10/0833 |
| 10,242,333 B1* | 3/2019 | Colucci, III | G06Q 10/083 |
| 10,482,421 B1* | 11/2019 | Ducrou | G06Q 10/0836 |
| 2002/0016726 A1* | 2/2002 | Ross | G06Q 10/08 705/339 |
| 2002/0016744 A1* | 2/2002 | Mitsuoka | G06Q 10/0631 705/330 |
| 2002/0049622 A1* | 4/2002 | Lettich | G06Q 10/063 705/7.11 |
| 2002/0052794 A1* | 5/2002 | Bhadra | G06Q 10/08 705/22 |
| 2002/0099567 A1* | 7/2002 | Joao | G06Q 10/083 340/539.13 |
| 2002/0147654 A1* | 10/2002 | Kraisser | G06Q 10/0631 705/330 |
| 2002/0194319 A1* | 12/2002 | Ritche | H04L 41/0631 709/223 |
| 2003/0036938 A1* | 2/2003 | Dutta | G06Q 10/06312 705/7.22 |
| 2003/0204452 A1* | 10/2003 | Wheeler | G06Q 10/08 705/28 |
| 2004/0026300 A1* | 2/2004 | Kibbler | B07C 1/02 209/579 |
| 2004/0030572 A1* | 2/2004 | Campbell | G01C 21/26 705/333 |
| 2004/0039715 A1* | 2/2004 | Gullo | G07B 17/0008 705/408 |
| 2004/0068443 A1* | 4/2004 | Hopson | G06Q 10/02 705/5 |
| 2004/0073499 A1* | 4/2004 | Martin | G06Q 10/08 705/28 |
| 2004/0128207 A1* | 7/2004 | Ray | G06Q 10/08 705/26.1 |
| 2004/0153433 A1* | 8/2004 | Nakamura | G06Q 10/08 |
| 2004/0211834 A1* | 10/2004 | Fleckenstein | G06Q 10/08 235/385 |
| 2004/0215480 A1* | 10/2004 | Kadaba | B07C 3/00 705/338 |
| 2004/0225624 A1* | 11/2004 | Reynolds | G06Q 10/08 705/401 |
| 2005/0154685 A1* | 7/2005 | Mundy | G06Q 10/08 705/404 |
| 2005/0171856 A1* | 8/2005 | Takahashi | G06Q 10/063 705/330 |
| 2005/0197844 A1* | 9/2005 | Ng | G06Q 10/08 705/333 |
| 2005/0197892 A1* | 9/2005 | Bilibin | G06Q 10/025 705/13 |
| 2005/0218222 A1* | 10/2005 | Nark | G06Q 10/06 235/384 |
| 2005/0234641 A1* | 10/2005 | Marks | G06Q 10/08 701/484 |
| 2005/0289008 A1* | 12/2005 | Olivier | G06Q 10/08 705/22 |
| 2006/0020366 A1* | 1/2006 | Bloom | G06Q 20/00 700/226 |
| 2006/0041481 A1* | 2/2006 | Stowe | G06Q 10/06 705/16 |
| 2006/0100893 A1* | 5/2006 | Cunningham | G06Q 10/08 705/1.1 |
| 2006/0111986 A1* | 5/2006 | Yorke | G06Q 30/06 705/26.1 |
| 2006/0206714 A1* | 9/2006 | Gubo | G06K 17/00 713/176 |
| 2006/0212356 A1* | 9/2006 | Lambert | G06Q 20/20 705/16 |
| 2006/0229895 A1* | 10/2006 | Kodger, Jr. | G06Q 10/025 705/333 |
| 2007/0000989 A1* | 1/2007 | Kadaba | B07C 3/008 235/375 |
| 2007/0016538 A1* | 1/2007 | Bielefeld | G06Q 10/08 705/410 |
| 2007/0106570 A1* | 5/2007 | Hartman | G06Q 30/0605 705/26.2 |
| 2007/0174148 A1* | 7/2007 | Schuler | G06Q 10/087 705/28 |
| 2008/0133659 A1* | 6/2008 | Aldrey | G06Q 10/08 709/204 |
| 2008/0312991 A1* | 12/2008 | Bharadwaj | G06Q 10/06316 705/7.26 |
| 2010/0201497 A1* | 8/2010 | Jones | G06K 17/00 340/10.41 |
| 2011/0088099 A1* | 4/2011 | Villani | G06Q 30/02 726/27 |
| 2011/0099121 A1* | 4/2011 | Holley | G06Q 10/08 705/333 |
| 2011/0178633 A1* | 7/2011 | Marrese | G06Q 10/08 700/229 |
| 2012/0059693 A1* | 3/2012 | Colodny | G06Q 10/083 705/14.1 |
| 2012/0271850 A1* | 10/2012 | Licata Messana | G06Q 10/06 707/779 |
| 2013/0066669 A1* | 3/2013 | Stevens | G06Q 10/04 705/7.14 |
| 2013/0151631 A1* | 6/2013 | Jensen | H04L 51/18 709/206 |
| 2013/0159144 A1* | 6/2013 | Higgins | G06Q 30/0601 705/26.81 |
| 2013/0238463 A1* | 9/2013 | Nishida | G06Q 30/0609 705/26.35 |
| 2013/0325893 A1* | 12/2013 | Asay | G06Q 10/0833 707/769 |
| 2014/0095274 A1* | 4/2014 | McLaughlin | G06Q 10/083 705/14.1 |
| 2014/0095350 A1* | 4/2014 | Carr | G06Q 10/083 705/26.8 |
| 2014/0149308 A1* | 5/2014 | Ming | G06Q 10/0833 705/333 |
| 2014/0164278 A1* | 6/2014 | Cattoor | G06Q 10/083 705/330 |
| 2014/0222522 A1* | 8/2014 | Chait | G06Q 10/0637 705/7.36 |
| 2015/0034720 A1* | 2/2015 | Minogue | G06Q 10/083 235/385 |
| 2015/0039347 A1* | 2/2015 | Sharma | G06Q 10/0833 705/4 |
| 2015/0145650 A1* | 5/2015 | Levan | G06Q 10/0833 340/10.1 |

(56) References Cited

U.S. PATENT DOCUMENTS

| | | | |
|---|---|---|---|
| 2015/0186842 A1* | 7/2015 | Daniarov | G06Q 10/0838; 705/341 |
| 2015/0193857 A1* | 7/2015 | Reed | G06Q 30/0633; 705/26.8 |
| 2015/0235151 A1* | 8/2015 | Winshell | G06Q 10/0633; 705/7.27 |
| 2015/0324741 A1* | 11/2015 | Parry | G06Q 10/0833; 705/333 |
| 2016/0036652 A1* | 2/2016 | Bellini, III | H04L 41/5074; 709/223 |
| 2016/0098581 A1* | 4/2016 | Mart Ascencio | H04N 1/00702; 340/5.82 |
| 2016/0104113 A1* | 4/2016 | Gorlin | G06Q 10/08355; 705/338 |
| 2016/0217399 A1* | 7/2016 | Roelofs | G06Q 30/0635 |
| 2016/0239789 A1* | 8/2016 | Hanks | G06Q 10/083 |
| 2016/0267603 A1* | 9/2016 | Wolch | G06Q 30/0601 |
| 2016/0314635 A1* | 10/2016 | Chen | G07C 9/00896 |
| 2016/0342946 A1* | 11/2016 | Herraiz Herraiz | G06Q 10/08 |
| 2016/0371643 A1* | 12/2016 | Parruck | G06Q 10/0833 |
| 2016/0379163 A1* | 12/2016 | Johanson | G06Q 10/0833; 705/333 |
| 2016/0379165 A1* | 12/2016 | Moakley | G06Q 10/0833; 705/333 |
| 2017/0098013 A1* | 4/2017 | Shirwadkar | G06F 16/36 |
| 2017/0154347 A1* | 6/2017 | Bateman | G06Q 30/0202 |
| 2017/0308850 A1* | 10/2017 | Roush | G01C 21/343 |
| 2017/0320569 A1* | 11/2017 | Gordon | H04L 67/12 |
| 2018/0032953 A1* | 2/2018 | Mayer | G06Q 10/0875 |
| 2018/0053153 A1* | 2/2018 | Mai | G06Q 30/0633 |
| 2018/0165631 A1* | 6/2018 | Romero | G08B 13/19665 |
| 2018/0165635 A1* | 6/2018 | Modica | G06Q 10/08 |
| 2018/0174093 A1* | 6/2018 | Perez | G06Q 10/0834 |
| 2018/0211201 A1* | 7/2018 | Nayak | G06Q 10/083 |
| 2018/0268348 A1* | 9/2018 | Guan | G06Q 10/08 |
| 2018/0315002 A1* | 11/2018 | Rotman | G06Q 10/083 |
| 2018/0341910 A1* | 11/2018 | Broveleit | G06Q 10/0833 |
| 2018/0341911 A1* | 11/2018 | Daoura | H04W 4/029 |
| 2018/0341914 A1* | 11/2018 | Levy | G06K 7/10297 |
| 2019/0012641 A1* | 1/2019 | Roberts | G06Q 10/0631 |
| 2019/0062055 A1* | 2/2019 | Hance | B65G 1/1373 |
| 2019/0102733 A1* | 4/2019 | Fang | G06Q 50/28 |
| 2019/0138974 A1* | 5/2019 | Knight | G06N 20/20 |
| 2019/0147398 A1* | 5/2019 | White | G06Q 10/0838; 705/333 |

* cited by examiner

FIG. 1C

SYSTEMS AND METHODS FOR AUTOMATIC PACKAGE TRACKING AND PRIORITIZED REORDERING

TECHNICAL FIELD

The present disclosure generally relates to computerized systems and methods for automatic package tracking and processing. In particular, embodiments of the present disclosure relate to inventive and unconventional systems that track a package through a logistics management system based on a collection of data from multiple subsystems.

BACKGROUND

With the advancement and proliferation of computer technology, online shopping, also known as e-commerce, has become one of the major avenues of commerce. Consumers and businesses are purchasing goods from online vendors more frequently than ever, and the number of transactions and sales revenue are projected to grow year-over-year at a staggering rate. As the scope and volume of e-commerce continue to grow, both the number of different items available online and the average number of purchases made in a given period are also growing exponentially. For example, the number of different items sold by one popular online retailer is said to have reached more than 600 million products, and the number of packages shipped per day by the same retailer, 1.6 million.

Each online purchase, by nature, requires a delivery of the purchased goods to its intended recipient. Each online purchase or order typically comprises of one or more goods, wherein the one or more goods can be packaged into one or more packages, each with its own promised delivery date. A typical order may be processed via steps such as: receiving, from a customer, an order for one or more goods; retrieving the one or more goods from an inventory; packaging the one or more goods into one or more packages; and delivering the one or more packages to the intended recipient before the promised delivery date. The promised delivery date may be set by the retailer itself or a shipping courier, or a specific date may be requested by the customer, which then may be assigned as the promised delivery date. An ideal system of order processing would deliver each package to the intended recipient by the promised delivery date without failure.

Currently existing order processing systems include a varying degree of automation and complexity in implementing the steps described above. With increasing number of different goods and orders, however, aggravated by the fact that the orders need to go through a complex network of subsystems and that some orders have complicating factors such as a partial return, current systems are problematic in that they are incapable of or largely inefficient at tracking individual packages from the moment an order is placed to the moment the order is fulfilled (i.e., every package in the order is delivered to the intended recipient or returned to the inventory). This problem is aggravated by the fact that increasing number of packages and focus on expeditious processing makes the system more prone to human error, such as omitting a package, mislabeling, or mis-sorting. For example, an order comprising of multiple packages with different promised delivery dates may end up with one or more lost or damaged packages mid-way through the system, which the system may not notice until a frustrated customer follows up.

In another example, one of the packages of the order may be delayed at some point in the system and a customer may request a redelivery of the package, in which case the system will need to reorder a new package because the system cannot tell why the existing package is delayed or how long it will need in order to clear the delay. In this case, both the existing delayed package and the new package may get delivered to the customer, incurring an unnecessary expense to the system. Even in some cases where the existing delayed package is correctly routed back to a warehouse, current systems may not be able to distinguish it from a package returned by a customer, requiring the delayed package to go through a full inspection process along with other customer-returned packages when it could have been set aside and restocked with only a minimal inspection as it had not reached a customer and thus was not opened. These scenarios serve to exemplify shortcomings of current systems and many other problems may also be apparent to those of ordinary skill in the art.

Therefore, there is a need for improved methods and systems for tracking orders and packages through the order processing system and proactively identifying and taking necessary actions to reduce the number of lingering orders that have not been delivered yet, all the while minimizing its impact on operating expenses.

SUMMARY

One aspect of the present disclosure is directed to a method for automatic package tracking. The method is performed by at least one processor connected to a computer system through a network interface and a database connected to the processor through the network interface. The method comprises steps for: receiving, through the network interface, aggregated information comprising an order, a first package identifier associated with a first package, and event data associated with a plurality of package identifiers that include the first package identifier, the order comprising a first group of items and the first package associated with the first group of items and is to be delivered to a first recipient within a first predetermined period of time through one or more existing routes; parsing the event data based on the first package identifier; determining whether the first package exists based on the parsed event data, wherein: if it is determined that the first package does not exist, flagging the first package identifier as meeting a first condition; and if it is determined that the first package does exist, determining whether the first package was not delivered because of lack of resources, wherein: if it is determined that the first package was not delivered because of lack of resources, flagging the first package identifier as meeting a second condition if the first predetermined period of time has passed by more than a first threshold; and transmitting a signal to the computer system to deliver the first package or to reorder the first package based on the determinations.

Another aspect of the present disclosure is directed to a computer-implemented system for automatic package tracking. The system comprises: a memory storing instructions; at least one processor; a database connected to the processor through a network interface; and a computer system connected to the processor through the network interface. The processor is configured to execute the instructions to perform steps for: receiving, through the network interface, aggregated information comprising an order, a first package identifier associated with a first package, and event data associated with a plurality of package identifiers that include the first package identifier, wherein the order comprises a first group of items, and wherein the first package is associated with the first group of items and is to be delivered to a first recipient within a first predetermined period of time through one or more existing routes; parsing the event data based on the first package identifier to determine the status of the first package; determining whether the first package exists based on the parsed event data, wherein: if it is determined that the first package does not exist, flagging the first package identifier as meeting a first condition; and if it is determined that the first package does exist, determining whether the first package was not delivered because of lack of resources, wherein: if it is determined that the first package was not delivered because of lack of resources, flagging the first package identifier as meeting a second condition if the first predetermined period of time has passed by more than a first threshold; and transmitting a signal to the computer systems to deliver the first package or to reorder the first package based on the determinations.

Yet another aspect of the present disclosure is directed to a computer-implemented system for automatic package tracking of multiple packages. The system comprises a first computer system, a mobile device, a database, and a second computer system. The mobile device comprises: a memory storing instructions; and at least one processor configured to execute the instructions to: generate event data by scanning package identifiers corresponding to a plurality of packages, the generated event data comprising at least one of a location, a time, a device identifier, or a user identifier; send the generated event data to the database via a network. The first computer system comprises: a memory storing instructions; and at least one processor configured to execute the instructions for: receiving, from the database through the network, aggregated information comprising a plurality of orders, a plurality of package identifiers, and the generated event data, each order comprising at least one group of items, wherein each package is associated with a group of items and is to be delivered to a respective recipient within a respective predetermined period of time through one or more existing routes; parsing the event data based on the plurality of package identifiers; determining whether each package exists based on the parsed event data, wherein: if it is determined that a particular package does not exist, flagging the particular package as meeting a first condition; and if it is determined that a particular package does exist, determining whether the particular package was not delivered because of lack of resources, wherein: if it is determined that the particular package was not delivered because of lack of resources, flagging the corresponding package identifier as meeting a second condition if the corresponding predetermined period of time has passed by more than a threshold; and based on the determinations, transmitting a signal to the second computer system via the network to cause delivery of each package or to reorder the flagged packages.

Other systems, methods, and computer-readable media are also discussed herein.

BRIEF DESCRIPTION OF THE DRAWINGS

Figure 1C:
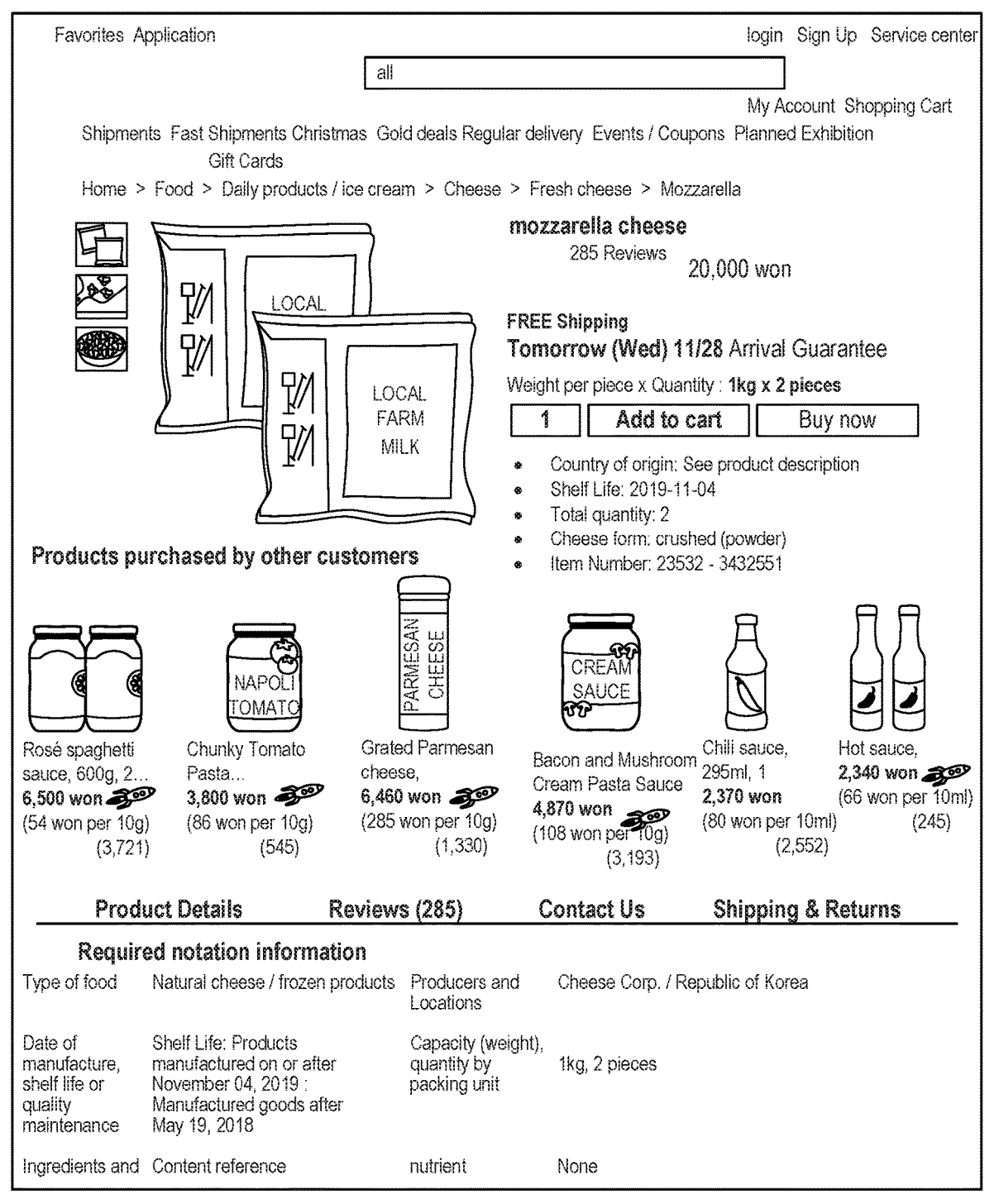

FIG. 1C depicts a sample Single Display Page (SDP) that includes a product and information about the product along with interactive user interface elements, consistent with the disclosed embodiments.

DETAILED DESCRIPTION

Figure 1A:
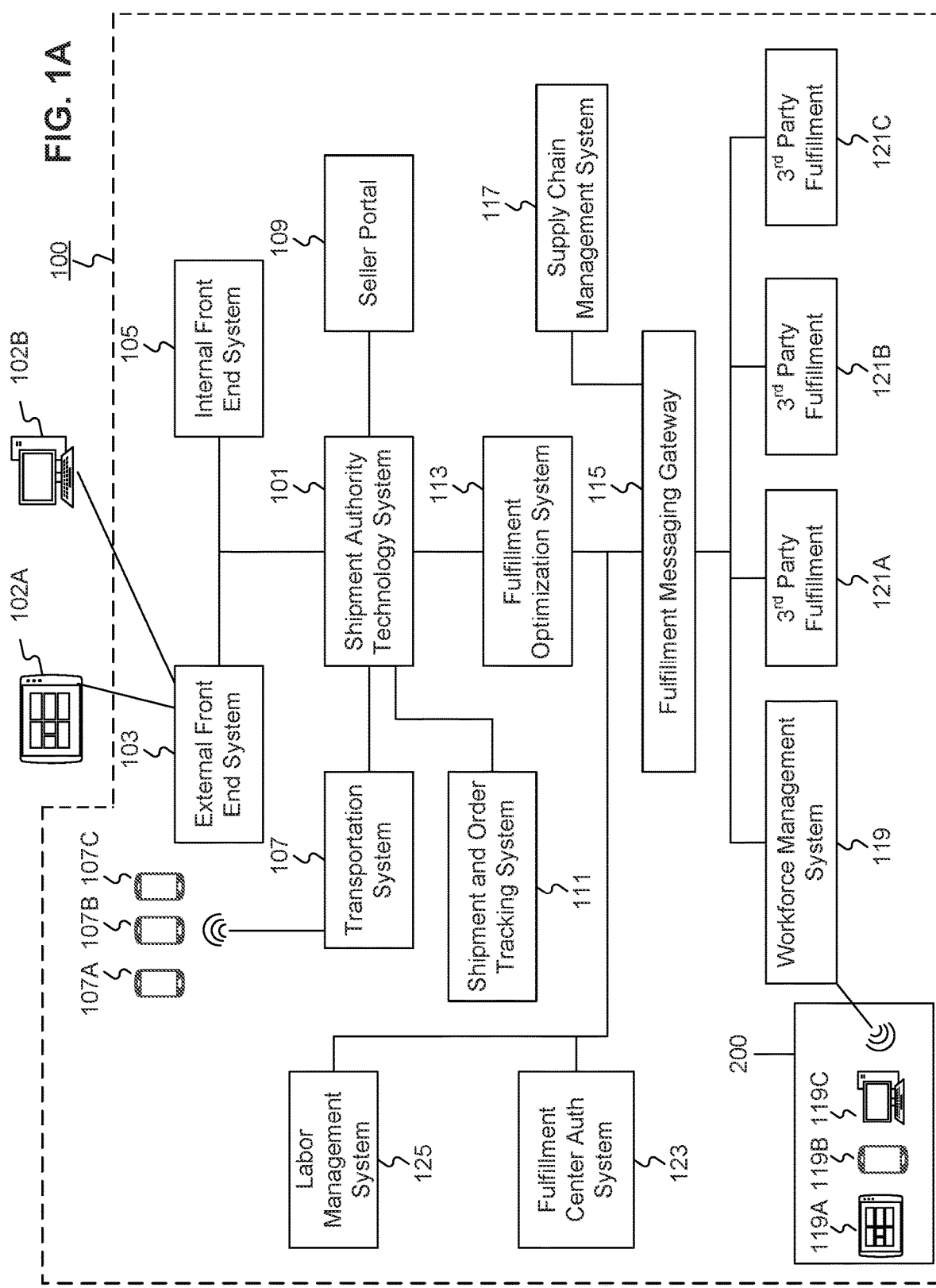
FIG. 1A is a schematic block diagram illustrating an exemplary embodiment of a network comprising computerized systems for communications enabling shipping, transportation, and logistics operations, consistent with the disclosed embodiments.
Figure 1B:
FIG. 1B depicts a sample Search Result Page (SRP) that includes one or more search results satisfying a search request along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods configured for automatic parcel tracking and processing.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, workforce management system 119, mobile devices 119A, 119B, and 119C (depicted as being inside of fulfillment center (FC) 200), $3^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
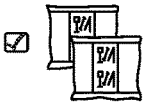
FIG. 1D depicts a sample Cart page that includes items in a virtual shopping cart along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where network 101 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from workforce management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfilment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfilment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or $3^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Workforce management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

$3^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMA 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
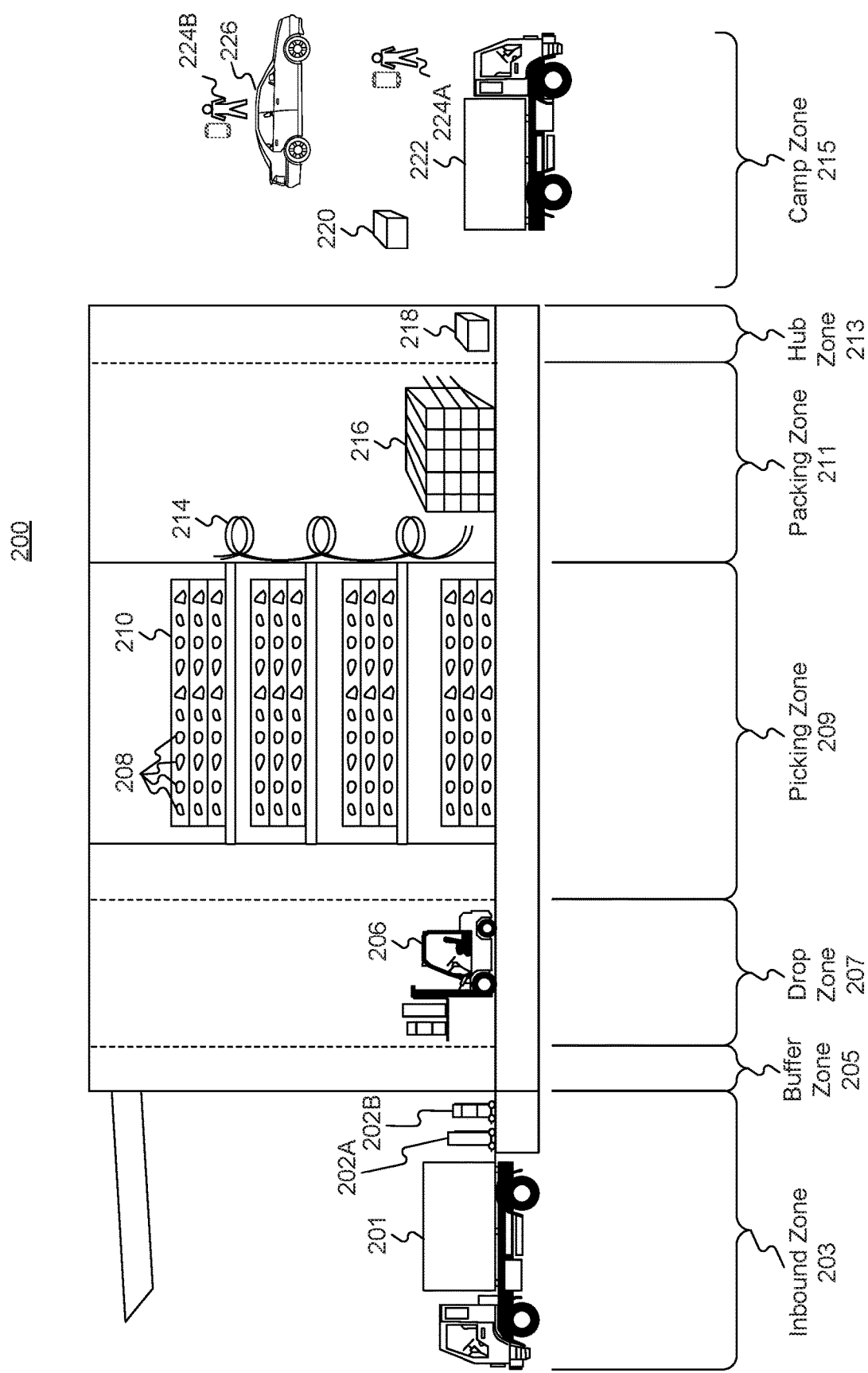
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 119B.

Once a user places an order, a picker may receive an instruction on device 119B to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, a cart, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

Referring back to FIG. 1A, an exemplary embodiment of a package tracking process for identifying and tracking individual packages is described. In some embodiments, SAT system 101 may initiate the package tracking process, electronically requesting and aggregating package information corresponding to individual packages, associated with currently pending orders and returns, from other systems such as external front end system 103, shipment and order tracking (SOT) system 111, FO system 113, FMG 115, WMS 119, and 3PL systems 121A-121C. A package may refer to a physical container (e.g., a box, a parcel, an envelope, or any packaging configured to hold one or more items) holding one or more items associated with an order or a return as tracked by a network of electronic systems (e.g., SAT system 101, FO system 113, etc.) using a unique package identifier.

The electronic request and aggregation of information may occur once a day (e.g., at the end of a day), multiple times per day at regular intervals or as needed, or in real-time as different systems generate additional information (e.g., delivery status updates). The different systems may also electronically send and receive information with SAT system 101 each at different times, intervals, or frequencies. The communication and transfer of information between SAT system 101 and each different system is described below.

In some embodiments, SAT system 101 may electronically request and aggregate order information from external front end system 103, internal front end system 105, or a customer return system (not shown). Upon receiving an electronic request for information from SAT system 101, external front end system 103, internal front end system 105, or a customer return system (not shown) may compile all order, return, and/or exchange data, which may include, for example, items in the order, quantity of each item, and PDD. The collected order information is then electronically sent to SAT system 101 for further processing. SAT system 101 may communicate continuously with external front end system 103, internal front end system 105, or a customer return system (not shown) so that the order information is continuously updated. Alternatively, the systems may communicate at a predefined interval or at predefined times, updating order information stored in SAT system 101 from time to time with new order information collected at external front end system 103, internal front end system 105, or a customer return system (not shown).

In some embodiments, SAT system 101 may also electronically request and aggregate delivery status information from SOT system 111. SAT system 101 may communicate continuously with SOT system 111 so that the delivery status information is continuously updated as each delivery attempt is made by a delivery worker 224A or 224B or at the end of each delivery run. Alternatively, the systems may communicate at a predefined interval or at predefined times, updating delivery status information stored in SAT system 101 from time to time with new delivery status information collected at SOT system 111. The delivery status information may include event data generated when a delivery worker 224A or 224B scans or reads package identifier on each package after a corresponding delivery attempt using a mobile device as described above.

The event data may comprise, for example, the scan/read time, date, a package identifier, delivery status, and intended recipient. If the delivery attempt was unsuccessful, the event data may also comprise a reason for the failed attempt, such as a determination of exceeded capacity at camp zone 215, a determination of a lack of resources during delivery, a determination of package that was mis-sorted, unavailability of a recipient, or a damaged package. Other reasons for non-delivery would be apparent to one of ordinary skill in the art and are within the scope of the invention. A delivery worker 224A or 224B using a mobile device (e.g., devices 107A-107C in FIG. 1) may add a reason for the non-delivery into the event data by selecting one or more reasons from a drop-down list displayed on a user interface. SAT system 101 may then add one or more corresponding reason codes to the event data and/or corresponding package information as described below. Furthermore, if a delivery worker 224A or 224B picked up a returned package from a customer during a delivery run, the event data may also comprise information for the returned package.

In some embodiments, SAT system 101 may also electronically request and aggregate package information from WMS 119 and 3PL systems 121A-121C. SAT system 101, WMS 119, and 3PL systems 121A-121C may communicate continuously with each other so that the package information is continuously updated as each package is scanned or read by a user using a mobile device as described above. Alternatively, the systems may communicate at a predefined interval or at predefined times, updating package information stored in SAT system 101 from time to time with new package information collected at the other systems. The package information may comprise event data as a user scans or reads package identifier on each package to indicate a particular event such as arriving at a camp or being loaded onto a delivery truck. The event data may further comprise a package identifier, a time, date, location, user identifier, or other information.

In order to request and collect package information from WMS 119 and 3PL systems 121A-121C, SAT system 101 may send an electronic request to FO system 113, which then may forward the electronic request to FMG 115. FMG 115 then may send an electronic request to each of WMS 119 and 3PL systems 121A-121C after converting the electronic request to another format or protocol appropriate for each system as described above.

Irrespective of the electronic requests from SAT system 101, WMS and 3PL systems 121A-121C may continuously gather and update package information corresponding to each package based on the event data gathered from individual devices (e.g., devices 107A-107C or 119A-119C) as the packages arrive at camp zone 215 or are loaded onto a truck 222 or a car 226. As described above, package information corresponding to a package may be organized based on the package identifier, and new event data may be associated with the appropriate package information based on the package identifier. In some embodiments, a package identifier may be scanned or read at least twice, first as they arrive at the camp zone 215, and second as they are loaded onto a truck 222 or a car 226 for delivery. Packages may also be scanned or read if a delivery worker 224A or 224B notices that the packaging (e.g., box, envelope, or tape) of the package and/or the contents therein are damaged.

Once the event data relating to every package in each of WMS 119 or 3PL systems 121A-121C is aggregated or as the event data for each package is generated, the event data is sent to FMG 115, which converts it to a standardized format if needed. FMG 115 then forwards the converted event data to FO system 113, which then forwards the event data to SAT system 101.

Once information from WMS 119 or 3PL systems 121A-121C are aggregated, SAT system 101 may then process the aggregated information, in real-time for example, to maintain a database of packages being processed through the system 100 at any given moment. This process may alternatively be performed once a day, multiple times per day at regular intervals or as needed, or in real-time as additional information is aggregated from the other systems. The processing may comprise: parsing the information to a standardized format or protocol; mapping one or more package identifiers (and thus the corresponding packages) to each order; consolidating and sorting all event data based on individual package identifiers; determining the history of individual packages based at least on the sequence of events corresponding to the corresponding package identifier; and determining the current status of individual packages based on their respective last event. The statuses a package could take may comprise, for example, arrived at camp zone 401, departed for delivery 501, delivery attempt unsuccessful 601, and delivery successful 701.

Figure 3:
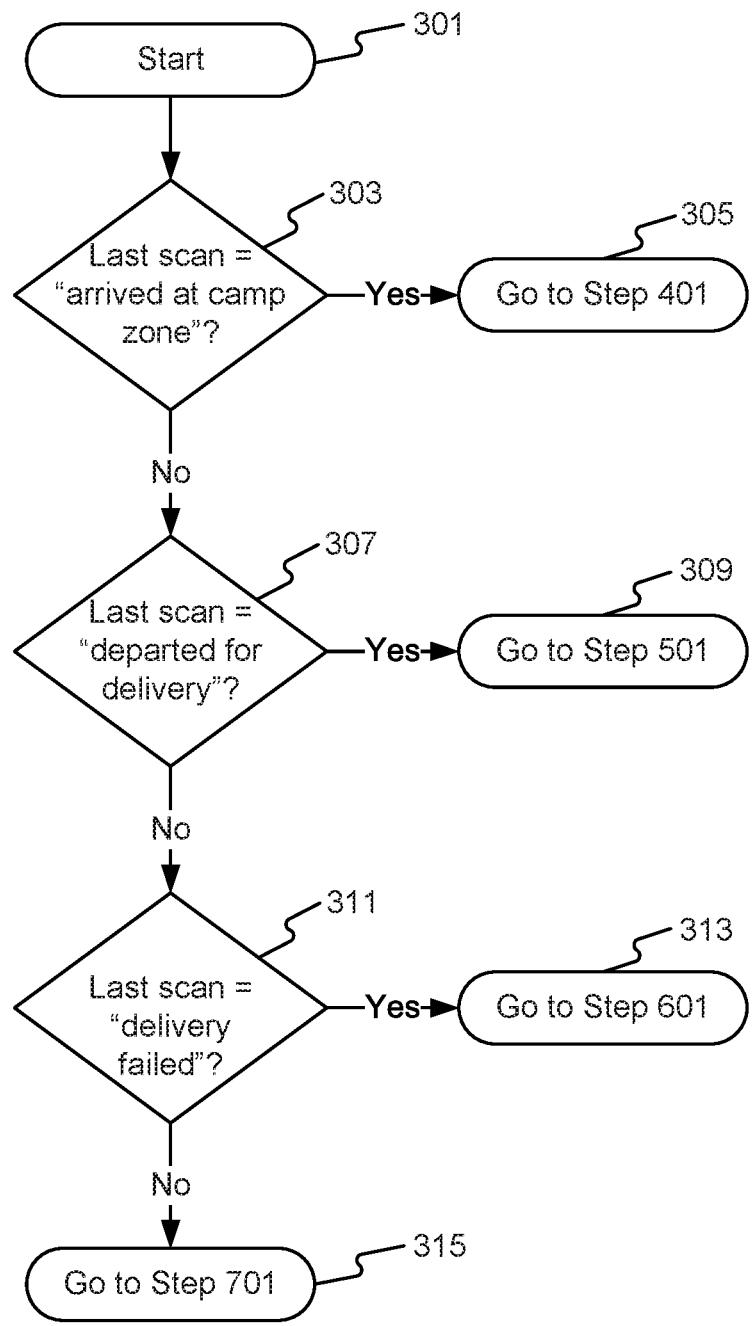
FIG. 3 is a flowchart of an exemplary computerized initiation process that is followed in order to determine an appropriate package tracking process, consistent with the disclosed embodiments.

FIG. 3 is a flowchart of an exemplary computerized initiation process 300 that SAT system 101 follows in order to determine the status of a package and the appropriate package tracking process to follow, consistent with the disclosed embodiments. In some embodiments, SAT system 101 may make the status determination based on the last event data associated with a package and/or the sequence of events associated with the package. Starting from step 301, SAT system 101 may, in some embodiments, determine the status of a package by requesting the last event data associated with the corresponding package identifier from, for example, WMS 119.

Alternatively or additionally, if the last event data indicates, for example, that the package was marked lost, SAT system 101 may determine the last known location based on previous event data or other accompanying data such as a user identifier (e.g., determining based on a user identifier and thus the user's assigned work area) and update the status accordingly. For example, a previous event data may indicate that the package departed for delivery, in which case SAT system 101 sets the status as being departed for delivery 501. In some embodiments where multiple event data exists for a package identifier with conflicting indications, SAT system 101 may choose to determine the status based on the latest one of the conflicting event data and ignore the others. In some embodiments, SAT system 101 may also determine that the current status of a package is incorrect and change the status.

Referring back to FIG. 3, SAT system 101 may determine, at step 303, whether the last event indicates that the package arrived at camp zone 215. If positive, SAT system 101 may update, at step 305, the package information associated with the package so its status indicates that the package has arrived at camp zone 215. The process may then continue with package tracking process 400 in FIG. 4.

If the determination from step 303 is negative, SAT system 101 may determine, at step 307, whether the last event indicates that the package departed for delivery. If the result of this determination is positive, SAT system 101 may update, at step 309, the package information associated with the package so its status indicates that the package was loaded onto a truck 222 or a car 226 and departed for delivery. The process may then continue with package tracking process 500 in FIG. 5.

If the determination at step 307 is negative, SAT system 101 may determine, at step 311, whether the last event indicates that a delivery attempt was made but failed. If the result of this determination is positive, SAT system 101 may update, at step 313, the package information associated with the package so its status indicates that the delivery attempt was unsuccessful. The process may then continue with package tracking process 600 in FIG. 6.

If the determination at step 311 is negative, SAT system 101 may determine that the package was successfully delivered and update, at step 315, the package information associated with the package so its status indicates that the delivery was successful. The process may then continue with package tracking process 700 in FIG. 7.

The four different statuses are only intended to serve as examples and an alternative set of statuses is also within the scope of the disclosed embodiments, and the initiation process 300 may be modified to add or remove other determinations to accommodate an alternative set of statuses.

Referring to FIGS. 4-7, exemplary package tracking processes 400, 500, 600, and 700 are described below, consistent with the disclosed embodiments. SAT system 101 may, at a predetermined interval (e.g., 24 hours), iterate through every package in the database and perform one or more of package tracking processes 400, 500, 600, and 700 based on the determinations described above in view of FIG. 3. SAT system 101 may iterate sequentially through each package in the database, selecting and stepping through an appropriate process based on the corresponding status assigned to each package, sort the packages according to their statuses, and perform each process in batches, or otherwise.

Package tracking processes 400, 500, 600, and 700 serve to verify that each package's information, which indicates that the package has not yet been delivered and therefore should have a corresponding package somewhere in FC 200, can actually be mapped to a corresponding package (e.g., by verifying that the package corresponding to package information having a status "arrived at camp zone" is actually located at camp zone 215). Package tracking processes 400, 500, 600, and 700 may also identify and correct package information that has been assigned an incorrect status and reorder packages if needed. The four different processes are only intended to serve as examples and an alternative set of processes that match the set of statuses employed above is also within the scope of the disclosed embodiments.

In some embodiments, other systems such as SOT system 111, FO system 113, and WMS 119 may halt processing packages while SAT system 101 is iterating through the database of packages and resume once SAT system 101 is finished. Alternatively, in other embodiments, other systems such as SOT system 111, FO system 113, and WMS 119 may continue processing packages at their regular speeds, respectively, or process them at a reduced speed. Additional event data generated by the other systems while SAT system 101 is performing the packaging tracking processes may be electronically stored at a temporary location and reconciled with the list of packages in database after SAT system 101 has finished iterating through the database of packages.

A shipment cycle may refer to the period of time from the moment SAT system 101 has finished performing one or more of package tracking processes 400, 500, 600, and 700 for every package information in the database to the moment after a predetermined interval (e.g., 24 hours), during which system 100 attempted to deliver every package, and SAT system 101 is about to begin performing one or more of package tracking processes 400, 500, 600, and 700 on each package information again. The beginning of a shipment cycle may coincide with the end of a work day or midnight, at which point every package has been loaded and attempted to be delivered at least once. In other words, each shipment cycle is separated by a period of time during which SAT system 101 performs package tracking processes 400, 500, 600, and 700.

It is important to note that, during every shipment cycle, every package in the system 100 may be attempted to be loaded and sent out for delivery via a truck 222 or a car 226 (e.g., every package in system 100 is loaded and sent out at least once each day). If a package could not be loaded at least once during a shipment cycle, WMS 119 may add event data to the corresponding package information in SAT system 101 that the package was not delivered due to exceeding capacity at camp zone 215 (e.g., the number of packages for delivery exceeded the number that can be processed at FC 200). It is also noted that each package may be at different locations (e.g., at camp zone 215, on a truck 222 or a car 226) while one or more of package tracking processes 400, 500, 600, and 700 are being performed.

At the end of a shipment cycle (i.e., before any of package tracking processes 400, 500, 600, and 700 begins), SAT system 101 may generate a list of packages currently in system 100, the package identifiers of which were scanned or read by a mobile device (e.g., 107A-107C or 119A-119C). As each package is being scanned or read, a damaged package may be omitted from the list of packages in order to be flagged as meeting the condition for reorder later during package tracking processes 400, 500, 600, or 700.

Figure 4:
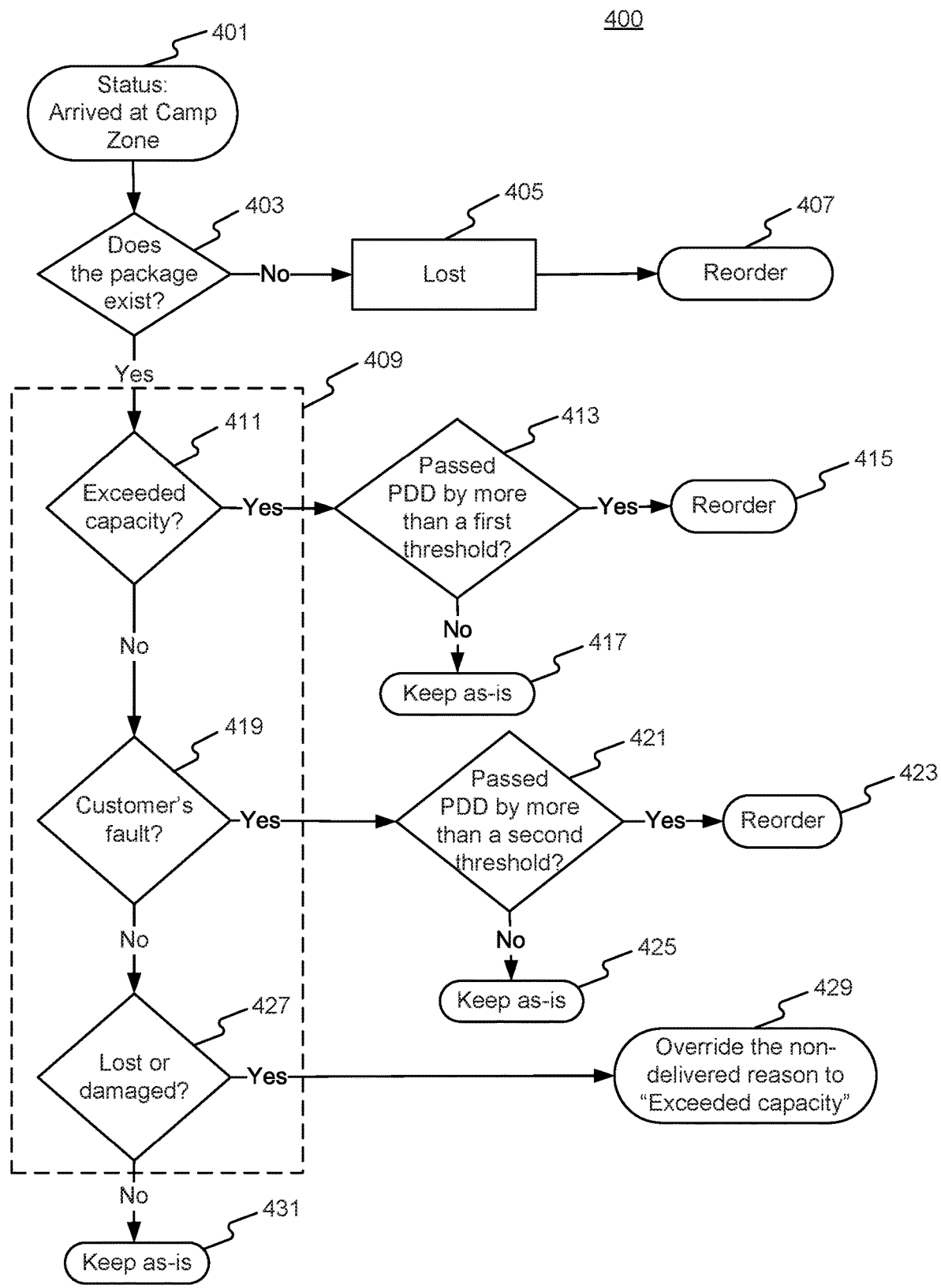
FIG. 4 is a flowchart of an exemplary computerized package tracking process that is followed when a package is determined to have arrived at a camp zone, consistent with the disclosed embodiments.

FIG. 4 depicts computerized package tracking process 400 that SAT system 101 may follow when a package is determined to have arrived at camp zone 215. The package may have arrived from hub zone 213 or a truck 222 or a car 226 after having been loaded for delivery.

At step 403, SAT system 101 may verify whether a particular package exists in system 100 by determining whether the corresponding package identifier was scanned or read at the end of the previous shipment cycle.

A negative determination from step 403 may indicate, as represented at step 405, that the package is lost (i.e., unaccounted for), and SAT system 101 may update the corresponding package information to flag the package identifier as meeting the condition for reorder at step 407. Flagging, for example, may comprise modifying a parameter (e.g., a priority status) in a database storing the corresponding package information.

On the other hand, a positive determination from step 403 may indicate that a physical package exists. In this case, the package may have never left camp zone 215 due to an internal delay (e.g., exceeded capacity at camp zone 215) or the package may have been out for delivery during the immediately preceding shipment cycle but came back to camp zone 215 without being delivered for one or more reasons (e.g., delivery truck could not complete delivery within working hours). In this situation, SAT system 101 may determine, at block 409, the reason why the package was not delivered based on the delivery status information from SOT system 111.

If it is determined that the non-delivery was due to exceeded capacity as represented at step 411, SAT system 101 may determine, at step 413, whether it has been more than a first predetermined length of time (e.g., 2 days) since the PDD. The capacity exceeded at step 411 may include, for example, number of available delivery workers 224A or 224B, number of available trucks 222 or cars 226 for delivery, and amount of space on a truck 222 or a car 226. In other embodiments, the length of time that must pass before a package is flagged as meeting the condition for reorder may be less than or greater than 2 days, such as half a day, 3 days, or the like. In yet other embodiments, the length of time may vary based on the particular resource that lacked.

If the determination from step 413 is positive, SAT system 101 may update the corresponding package information to flag the package identifier as meeting the condition for reorder at step 415 in a manner similar to step 407 described above. If not, as represented at step 417, SAT system 101 may leave the corresponding package information unchanged, so that the package may be attempted for delivery again during the next shipment cycle, and process the next package in the database.

Referring back to block 409, if the non-delivery was instead due to a customer's fault as represented at step 419, SAT system 101 may determine whether more than a second predetermined length of time (e.g., 4 days) has passed since the PDD (step 421) and flag the corresponding package identifier as meeting the condition for reorder at step 423 in a manner similar to step 407 described above. If not, as represented at step 425, SAT system 101 may leave the corresponding package information unchanged. In other embodiments, the second predetermined length of time may be less than or greater than 4 days, such as half a day, 5 days, or the like. In yet other embodiments, the length of time may vary based on the particular delay caused by the customer.

Referring back to block 409, if the non-delivery was instead due to a lost or damaged package as represented at 427, SAT system 101 may determine that there is an error in the package information because the package was previously determined to exist at step 403 (i.e., physically present and undamaged) yet the non-delivered reason indicates that the package is lost or damaged. In this case, SAT system 101 may override the non-delivered reason in the package information to "exceeded capacity" as represented at step 429, thus attributing the unknown reason for non-delivery to an internal delay as opposed to, for example, a customer's fault.

If the determination at step 427 is negative, indicating that the reason for non-delivery was something else, SAT system 101 may leave the corresponding package information unchanged at step 431, so that the package may be attempted for delivery again during the next shipment cycle, and process the next package in the database.

Figure 5:
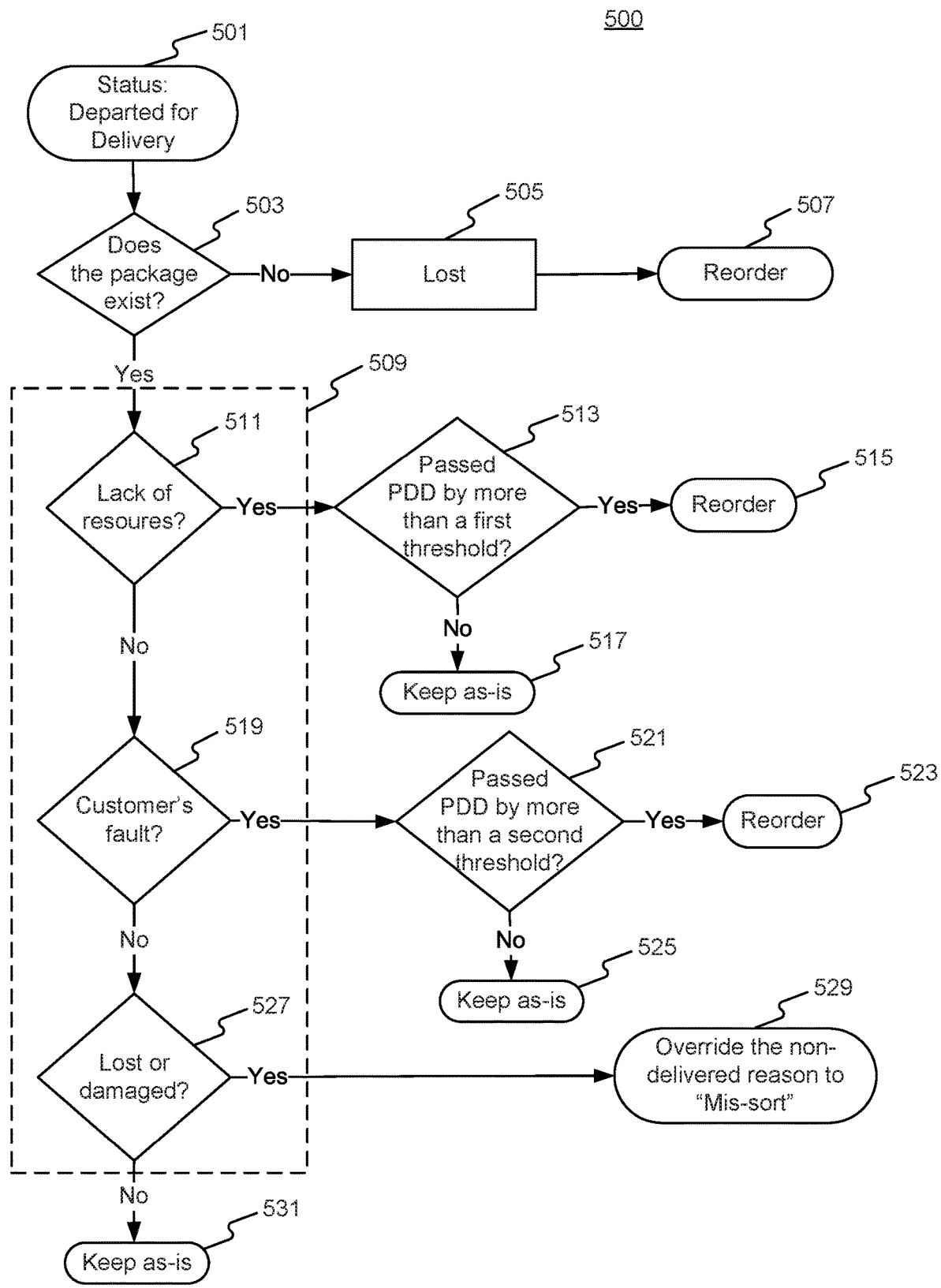
FIG. 5 is a flowchart of an exemplary computerized package tracking process that is followed when a package is determined to have departed for delivery, consistent with the disclosed embodiments.

FIG. 5 depicts computerized package tracking process 500 that SAT system 101 may follow when a package is determined to have departed for delivery, for example, if a package departed during the immediately preceding shipment cycle but a delivery attempt was not made.

At step 503, SAT system 100 may verify, as described above with respect to step 403, whether the package still exists in the system. A negative determination from step 503 may indicate, as represented at step 505 and described above with respect to step 405, that the package is lost. SAT system 101 may then flag the corresponding package identifier as meeting the condition for reorder at step 507 in a manner similar to step 407 described above.

On the other hand, if the package is verified to exist at step 503, SAT system 101 may then determine, at block 509, why the package was not delivered based on the delivery status information from SOT system 111. If it is determined that the non-delivery was due to lack of resources such as delivery time, SAT system 101 may determine whether more than a first predetermined length of time has passed since the PDD (step 513) and flag the corresponding package information as meeting the condition for reorder if so (step 515) or keep the corresponding package information unchanged (step 517) as described above with respect to steps 413-417.

Alternatively, if it is determined that the non-delivery was instead due to a customer's fault as represented at step 519, SAT system 101 may determine whether more than a second predetermined length of time has passed since the PDD (step 521) and flag the corresponding package information as meeting the condition for reorder if so (step 523) or keep the package information unchanged (step 525) as described above with respect to steps 521-525.

Even still, if it is determined in block 509 that the non-delivery was instead due to a lost or damaged package as represented at 527, SAT system 101 may determine that there is an error as described above with respect to step 427. In this case, SAT system 101 may override the non-delivered reason to "mis-sort" (step 529), indicating that the package was mis-sorted (e.g., loaded on to a wrong delivery truck 222 or car 226) because the previous determinations indicate that the package had departed for delivery (step 501) but is still at camp zone 215 for some reason (step 503), suggesting that the package had not been where it was supposed to be. SAT system 101 may attempt to deliver these packages during the following shipment cycle If the determination at step 527 is negative, indicating that the reason for non-delivery was something else, SAT system 101 may keep the corresponding package information unchanged (step 531) as described above with respect to step 431.

Figure 6:
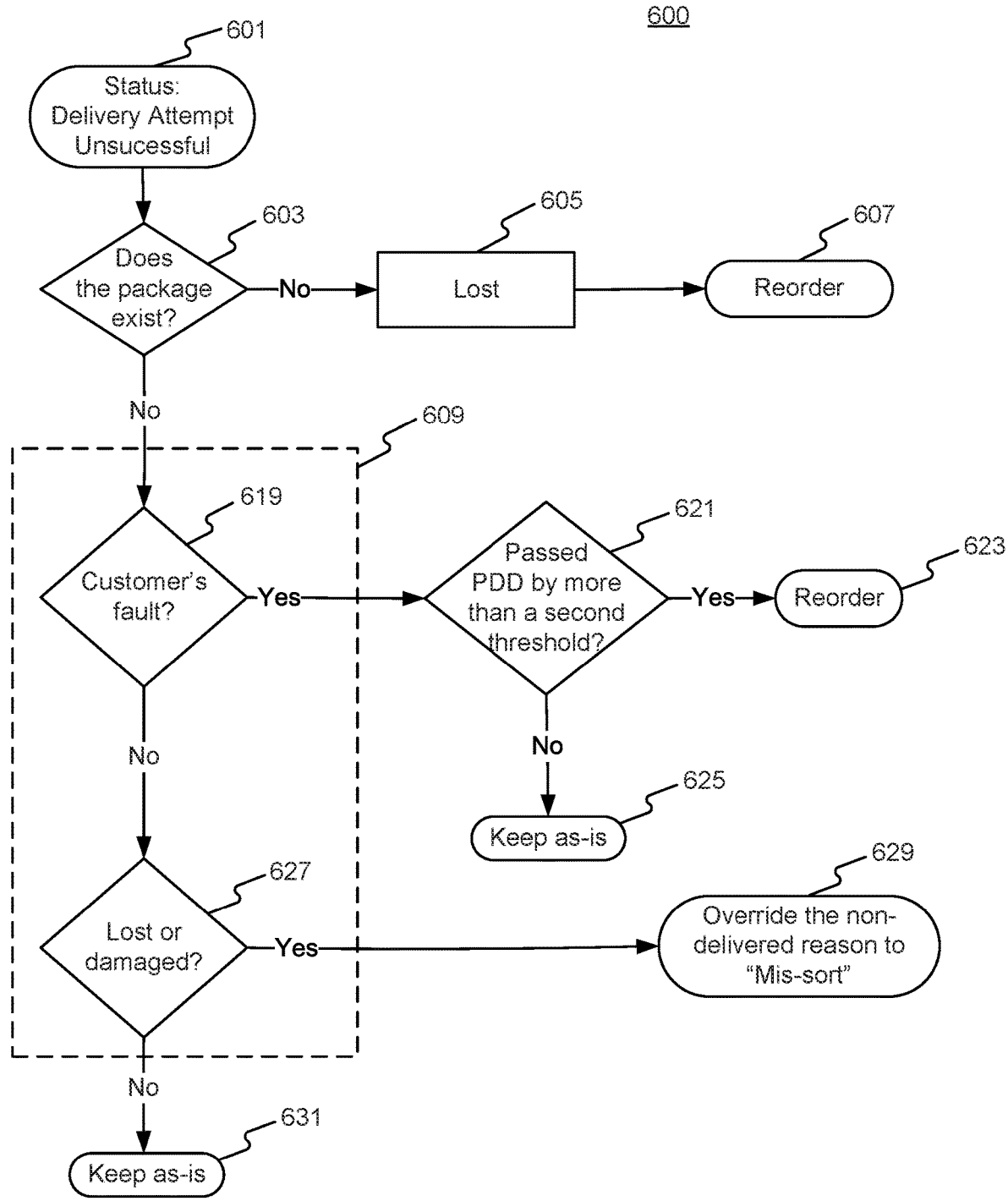
FIG. 6 is a flowchart of an exemplary computerized package tracking process that is followed when a package is determined to have failed to be delivered, consistent with the disclosed embodiments.

FIG. 6 depicts computerized package tracking process 600 that SAT system 101 may follow when SAT system 101 determines that the package failed to deliver, for example, during the immediately preceding shipment cycle (e.g., a delivery person 224A or 224B arrived at the recipient's address but was unable to complete the delivery because the recipient was not present).

At step 603, SAT system 101 may verify, as described above with respect to step 503, whether the package still exists in the system. A negative determination from step 603 may indicate, as represented at step 605, that the package is lost. SAT system 101 may then flag the corresponding package identifier as meeting the condition for reorder at step 607 in a manner similar to step 407 described above.

If the package is verified to exist at step 603, SAT system 101 may then determine, at block 609, why the package was not delivered based on the delivery status information from SOT system 111. If it is determined that the non-delivery was due to a customer's fault as represented at step 619, SAT system 101 may determine whether more than a second predetermined length of time has passed since the PDD (step 621) and flag the corresponding package information as meeting the condition for reorder if so (step 623) or keep the package information unchanged (step 625) as described above with respect to steps 621-625.

Alternatively, if it is determined in block 609 that the non-delivery was instead due to a lost or damaged package as represented at 627, SAT system 101 may determine that there is an error and override the non-delivered reason to "mis-sort" (step 629) as described above with respect to steps 527-529. If the determination at step 627 is negative, indicating that the reason for non-delivery was something else, SAT system may keep the corresponding package information unchanged (step 631) as previous described above with respect to step 431.

In this case, SAT system 101 may not consider whether the non-delivery was due to lack of resources as it did in other package tracking processes 400 and 500 because a delivery attempt was indeed made, which means that, for example, the delivery person 224A or 224B had enough resources to arrive at the recipient's address and attempt the delivery.

Figure 7:
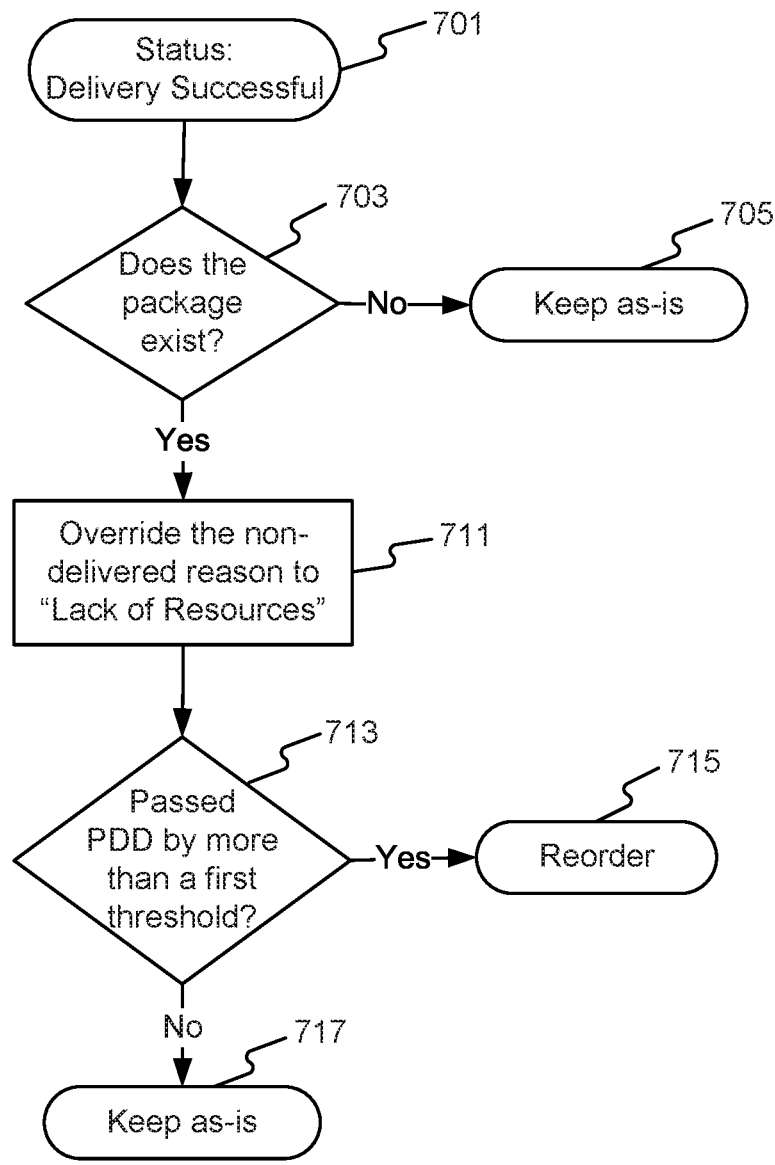
FIG. 7 is a flowchart of an exemplary computerized package tracking process that is followed when a package is determined to have been successfully delivered, consistent with the disclosed embodiments.

FIG. 7 depicts package tracking process 700 that SAT system 101 follows when it determines that a package was successfully delivered, for example, during the immediately preceding shipment cycle.

At step 703, SAT system 101 may verify, as described above with respect to step 503, whether the package still exists in the system. A negative determination correctly indicates that the package does not exist in the system 100, and the corresponding package information is left unchanged at step 705, because it is true that a delivered package may not exist within system 100. A positive determination, however, indicates that the information from SOT system 111, and thus the current status of the package may be improper because a delivered package can no longer exist in system 100. In this case, SAT system 101 may override, at step 711, the information associated with the package to indicate that the package was not delivered due to lack of resources. SAT system 101 may then determine, at step 713, whether more than a first predetermined length of time has passed since the PDD and take appropriate actions at steps 715 or 717 based on the determination, as described above with respect to steps 513-517. In other embodiments, SAT system 101 may override, at step 711, the corresponding package information to assign a different status and/or a reason for the unsuccessful delivery.

In some embodiments, blocks 409, 509, 609, 709 may expand to comprise more reasons for non-delivery. Reasons for non-delivery 411, 419, 427, 511, 519, 527, 619, and 627 may also split to comprise more detailed sub-reasons. For example, reason 511 may be divided into sub-reasons based on the different resources that lacked, and reason 519 may be divided into sub-reasons based on the different types of delays caused by a customer. Furthermore, the first and second predetermined lengths of times at steps 413, 421, 513, 521, 621, and 713 may be different from one another to comprise six or more predetermined lengths of times based on the combination of status and reason for non-delivery. An alternative embodiment where one of more groups of the predetermined lengths of times have equal lengths of times is also within the scope of the present invention.

In some embodiments, once SAT system 101 has determined the packages to be reordered based on at least one or more of steps 407, 415, 423, 507, 515, 523, 607, 623, and 715 as described above, such packages are processed through another exemplary process for reordering the packages and having them expedited through system 100. Additionally, in some embodiments, SAT system 101 may also indicate a package for reordering by updating the corresponding package information upon receipt of a request from an internal user (e.g., employee of an organization that owns, operates, or leases system 100). In some embodiments, the reordering process may comprise: identifying the items held by the package indicated for reordering in its corresponding package information (i.e., flagged package), identifying the order associated with the corresponding package identifier, canceling a portion of the identified order, creating and processing a new order with the identified items, updating the package information associated with the new order as high-priority, and delivering the corresponding package via a new delivery routes and/or sub-routes.

For ease of explanation without causing ambiguity, the reordering process will be described using an example, where an order comprises a first group of items, packaged together into a first package with a first package identifier and corresponding first package information, and a second group of items, packaged together into a second package with a second package identifier and corresponding second package information. For this example, SAT system 101 may determine that the first package was delivered to its intended recipient successfully but the second package was damaged. In this case, as described above with respect to step 415, SAT system 101 may update the second package information to flag the second package identifier as meeting the condition for reorder along with other packages, if any, in the database that may need to be reordered as determined from one or more of package tracking processes 400, 500, 600, and 700 described above.

Then, as part of the reordering process, SAT system 101 may proceed to identify the items in the second package (which, in this example, would be the second group of items defined above) based on the actual content of the package upon manual inspection and/or the order information and package information collected in the manner described above. Once the items and the order are identified, SAT system 101 may proceed to cancel the portion of the order corresponding to the items without affecting the other portions of the order that are not indicated for reorder and otherwise without issue. Then SAT system 101 may send a request to FO system 113 to create a new order comprising the second group of items. Effectively, a partial order comprising a single group of items, and thus packaged into a single package, is created and placed within system 100 to be processed along with the other packages.

In some embodiments, SAT system 101 may also indicate the corresponding new package information as "high-priority," which is communicated to other system elements (e.g., SOT system 111 and WMS 119) and displayed as a notification to an internal user (e.g., employee of an organization that owns, operates, or leases system 100) and/or a delivery worker 224A or 224B. One or more mobile devices 107A-107C of transportation system 107 and/or 119A-119C of a FC 200 may display the "high-priority" notification when scanning or reading the corresponding package identifier so that an internal user may prioritize processing the package before others.

In some embodiments, high-priority packages may be processed and delivered by a dedicated group of internal users within each system (e.g., a group of internal users in transportation system 107 or a group of internal users in WMS 119) to ensure that the packages are packaged and delivered as quickly as possible regardless of how many other non-high-priority packages there may be. Still further, in some embodiments, SOT system 111 may create new delivery routes and/or sub-routes configured to optimize delivery of the high-priority packages.

In some situations, SAT system 101 may determine that the new packages cannot be delivered on or before the original PDD created at the time of the original order. In these cases, SAT system may send a request to FO system 113 for an updated PDD based on one or more factors as described above. The updated PDD may be used for internal order tracking or be disclosed to the intended recipient and/or the purchaser to apprise them of their order status.

In some embodiments, while the packages determined to be lost based on one or more of package tracking processes 400, 500, 600, and 700 are processed through the reordering process as described above, a portion of internal users may be dedicated to locating the lost packages and forwarding them to a return staging zone (not pictured) located inside FC 200. Alternatively or additionally, one or more previously lost packages may be discovered while internal users are performing their respective regular duties, at which point the internal user may also forward the package to the return staging zone.

It is preferable that the system 100 not attempt to redeliver the discovered package to the original intended recipient because the new high-priority package created through the reordering process above will then need to be cancelled and prevented from being delivered, which may slow down the system 100. Additionally, in some embodiments, the packages determined to be damaged based on one or more of package tracking processes 400, 500, 600, and 700 may also be forwarded to the return staging zone so that items therein may be retrieved. A subset of the items therein may still be in saleable condition.

In some embodiments, lost packages that have been located, damaged packages, and/or other packages cancelled before reaching the intended recipient due to their being flagged as meeting the condition for reorder are forwarded to the return staging zone for restocking. In such embodiments, SAT system 101 may update the package information corresponding to the forwarded packages as internal return, distinct from returned packages received from customers. The items inside such forwarded packages are relatively more likely to be in a sealed, saleable condition than other customer-initiated returns because no one has opened them as they were being processed through system 100. As such, the items packaged therein may be forwarded and rerouted to picking zone 209 with minimal inspection, thereby saving the cost of performing a relatively more thorough inspection, shortening processing times, and saving the cost of duplicate orders.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system for automatic package tracking, the system comprising:
   a memory storing instructions;
   at least one processor;
   a database connected to the at least one processor through a network interface; and
   a computer system connected to the at least one processor through the network interface,
   wherein the at least one processor is configured to execute the instructions to perform steps for:
      receiving, through the network interface, aggregated information comprising an order, a first package identifier associated with a first package, and event data associated with a plurality of package identifiers that include the first package identifier, wherein the order comprises a first group of items,
         the event data being generated based on a plurality of packages associated with the plurality of package identifiers being transported through an automated transport system,
         the first package being associated with the first group of items, and is to be delivered to a first recipient within a first predetermined period of time through one or more existing routes;
      parsing the event data based on the first package identifier;
      determining whether the first package exists based on the parsed event data, wherein:
         if it is determined that the first package does not exist, flagging the first package identifier as meeting a first condition; and
         if it is determined that the first package does exist, determining whether the first package was not delivered because of lack of resources, wherein:
            if it is determined that the first package was not delivered because of lack of resources, flagging the first package identifier as meeting a second condition if the first predetermined period of time has passed by more than a first threshold;
      transmitting a signal to the computer system to deliver the first package or to reorder the first package in response to the first package identifier being flagged as meeting the first condition or the second condition;
      receiving, through the network interface, a new package identifier in response to the first package identifier being flagged as meeting the first condition or the second condition; and,
      controlling the automated transport system to receive a new package associated with the new package identifier and containing the first group of items previously associated with the first package identifier, the automated transport system configured to carry the new package from a first location to a second location in response to the first package identifier flagged as meeting the first condition or the second condition.

2. The computer-implemented system of claim 1, wherein the order further comprises a second group of items corresponding to a second package and the plurality of package identifiers further comprises a second package identifier associated with the second package;
   wherein the second package is to be delivered to the first recipient within a second predetermined period of time through the one or more existing routes; and
   wherein the steps for parsing, determining, and transmitting are repeated for the second package and the second package identifier.

3. The computer-implemented system of claim 1, wherein parsing the event data comprises:
   filtering the event data to isolate the event data associated with the first package identifier;

parsing the isolated event data to determine a temporal relationship among the events;
determining the chronological sequence of events; and
determining a status of the first package based on the chronological sequence of events.

4. The computer-implemented system of claim 1, wherein the first package was attempted to be delivered to the first recipient.

5. The computer-implemented system of claim 1, wherein reordering the first package comprises:
cancelling a portion of the order corresponding to the first group of items;
creating a new order with the first group of items;
creating a new package identifier associated with a new package for holding the first group of items;
flagging the new package identifier as high-priority;
transmitting the new package identifier to the computer system; and
forwarding the first package to be restocked.

6. The computer-implemented system of claim 5, wherein flagging the new package identifier comprises updating a parameter associated with the new package identifier.

7. The computer-implemented system of claim 6, wherein the new package identifier causes the computer system to process the new package more quickly compared to other packages associated with corresponding package identifiers that are not flagged as high-priority.

8. The computer-implemented system of claim 7, wherein the new package identifier further causes a device to display a notification upon scanning the new package using the device, the notification comprising specific instructions about the new package.

9. The computer-implemented system of claim 7, wherein the new package identifier causes the computer system to create a new route optimized for delivering the new package.

10. The computer-implemented system of claim 6, wherein reordering the first package further comprises calculating a new period of time for delivering the new package to the first recipient.

11. The computer-implemented system of claim 1, further comprising:
receiving the aggregated information relating to an order through the network interface based on the aggregated information relating to the order being updated.

12. The computer-implemented system of claim 1, wherein receiving the aggregated information relating to an order is repeated at a first predetermined interval.

13. The computer-implemented system of claim 12, wherein the steps for parsing, determining, and transmitting are repeated at a second predetermined interval longer than the first predetermined interval.

14. The computer-implemented system of claim 1, wherein the lack of resources comprises at least one of lack of time, lack of workers, or lack of space.

15. The computer-implemented system of claim 14, wherein the first threshold is variable based on the particular resource that was lacking.

16. The computer-implemented system of claim 1, wherein a status of the first package is determined by a request manually inputted by a user.

17. The computer-implemented system of claim 1, wherein if it is determined that the first package was not delivered because of other reasons, flagging the first package as meeting a third condition if the first predetermined period of time has passed by more than a second threshold.

18. The computer-implemented system of claim 1, wherein a status of the first package comprises: arrived at a warehouse, departed for delivery, delivery attempt unsuccessful, or delivery successful.

19. A computer-implemented system for automatic package tracking of multiple packages, the system comprising a first computer system, a mobile device, a database, and a second computer system, wherein
the mobile device comprises:
a memory storing instructions; and
at least one processor configured to execute the instructions to:
generate event data by scanning package identifiers corresponding to a plurality of packages, the generated event data comprising at least one of a location, a time, a device identifier, or a user identifier,
the event data being generated based on the plurality of packages being transported through an automated transport system; and
send the generated event data to the database via a network; and
the first computer system comprises:
a memory storing instructions; and
at least one processor configured to execute the instructions for:
receiving, from the database through the network, aggregated information comprising a plurality of orders, a plurality of package identifiers, and the generated event data, each order comprising at least one group of items,
wherein each package is associated with a group of items and is to be delivered to a respective recipient within a respective predetermined period of time through one or more existing routes;
parsing the event data based on the plurality of package identifiers;
determining whether each package exists based on the parsed event data, wherein:
if it is determined that a particular package does not exist, flagging the corresponding package identifier as meeting a first condition; and
if it is determined that a particular package does exist, determining whether the particular package was not delivered because of lack of resources, wherein:
if it is determined that the particular package was not delivered because of lack of resources, flagging the corresponding package identifier as meeting a second condition if the corresponding predetermined period of time has passed by more than a threshold;
in response to the one or more package identifiers being flagged as meeting the first condition or the second condition, transmitting a signal to the second computer system via the network to cause delivery of each package or to reorder the flagged packages;
receiving, through the network, one or more new package identifiers in response to the one or more package identifiers being flagged as meeting the first condition or the second condition; and
controlling the automated transport system to receive one or more new packages associated with the new package identifiers and containing one or more groups of items previously associated with the package identifiers flagged as meeting the first condition or the second condition, the automated transport system configured to carry the new packages from a first location to a second location in response to the package identifiers flagged as meeting the first condition or the second condition.

* * * * *